(12) United States Patent
Voronin

(10) Patent No.: US 11,761,062 B2
(45) Date of Patent: Sep. 19, 2023

(54) POLYCRYSTALLINE DIAMOND CONSTRUCTIONS

(71) Applicant: Smith International, Inc., Houston, TX (US)

(72) Inventor: Georgiy Voronin, Provo, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1030 days.

(21) Appl. No.: 16/309,470

(22) PCT Filed: Jun. 26, 2017

(86) PCT No.: PCT/US2017/039180
§ 371 (c)(1),
(2) Date: Dec. 13, 2018

(87) PCT Pub. No.: WO2018/005310
PCT Pub. Date: Jan. 4, 2018

(65) Prior Publication Data
US 2019/0160536 A1    May 30, 2019

Related U.S. Application Data

(60) Provisional application No. 62/355,434, filed on Jun. 28, 2016.

(51) Int. Cl.
*E21B 10/55* (2006.01)
*E21B 10/46* (2006.01)
(Continued)

(52) U.S. Cl.
CPC ............... *C22C 26/00* (2013.01); *B01J 3/062* (2013.01); *B22F 1/12* (2022.01); *B22F 3/1007* (2013.01);
(Continued)

(58) Field of Classification Search
CPC ........ E21B 10/46; E21B 10/55; E21B 10/567; B01J 3/062
See application file for complete search history.

(56) References Cited

U.S. PATENT DOCUMENTS 3,816,085 A    6/1974   Hall
3,850,053 A *  11/1974  Bovenkerk ............ B24D 18/00
                                                    51/307
(Continued)

FOREIGN PATENT DOCUMENTS

CN    102059341 A    5/2011
FR       2327197 A1    5/1977
(Continued)

OTHER PUBLICATIONS

First Office Action and Search Report issued in Chinese patent application 201780033405.7 dated Sep. 18, 2020, 19 pages.
(Continued)

*Primary Examiner* — Pegah Parvini
(74) *Attorney, Agent, or Firm* — Jeffrey D. Frantz

(57) ABSTRACT

Polycrystalline diamond constructions are formed from a mixture of diamond grains including a first volume of fine-sized diamond grains, and a second volume of coarse-sized diamond grains. The fine-sized diamond grains are partially graphitized, and the coarse-sized diamond grains are not graphitized. The mixture of diamond grains is subjected to high pressure/high temperature sintering process conditions in the presence of a sintering aid thereby forming polycrystalline diamond. Contact areas between coarse-sized diamond grains in the polycrystalline diamond construction are substantially free of graphite.

19 Claims, 6 Drawing Sheets

(51) Int. Cl.
*E21B 10/567* (2006.01)
*B01J 3/06* (2006.01)
*C22C 26/00* (2006.01)
*B22F 5/00* (2006.01)
*B22F 1/12* (2022.01)
*B22F 3/10* (2006.01)

(52) U.S. Cl.
CPC ............... *B22F 5/00* (2013.01); *E21B 10/46* (2013.01); *E21B 10/55* (2013.01); *E21B 10/567* (2013.01); *B01J 2203/0655* (2013.01); *B01J 2203/0685* (2013.01); *B22F 2005/001* (2013.01); *B22F 2201/00* (2013.01); *B22F 2302/406* (2013.01); *B22F 2303/20* (2013.01); *B22F 2999/00* (2013.01)

(56) References Cited

U.S. PATENT DOCUMENTS

| | | | |
|---|---|---|---|
| 4,104,441 A | 8/1978 | Fedoseev et al. | |
| 4,604,106 A | 8/1986 | Hall | |
| 4,636,253 A * | 1/1987 | Nakai | B01J 3/062 75/242 |
| 5,011,514 A | 4/1991 | Cho et al. | |
| 5,759,216 A * | 6/1998 | Kanada | B01J 3/062 51/309 |
| 5,855,996 A | 1/1999 | Corrigan et al. | |
| 6,132,675 A | 10/2000 | Corrigan et al. | |
| 6,179,886 B1 | 1/2001 | Gordeev et al. | |
| 6,951,578 B1 * | 10/2005 | Belnap | C22C 26/00 75/231 |
| 8,057,562 B2 | 11/2011 | Middlemiss | |
| 8,151,911 B1 | 4/2012 | Miess | |
| 8,496,076 B2 | 7/2013 | DiGiovanni et al. | |
| 8,522,900 B2 | 9/2013 | Bellin | |
| 8,622,157 B1 | 1/2014 | Bertagnolli et al. | |
| 8,784,517 B1 | 7/2014 | Gonzalez et al. | |
| 8,784,767 B2 | 7/2014 | Sumiya et al. | |
| 8,840,831 B2 | 9/2014 | Davies et al. | |
| 8,852,546 B2 | 10/2014 | Keshavan et al. | |
| 8,858,663 B2 | 10/2014 | Schmitz et al. | |
| 8,978,789 B1 | 3/2015 | Sani et al. | |
| 8,986,408 B1 | 3/2015 | Sani | |
| 9,091,131 B2 | 7/2015 | Yu et al. | |
| 9,254,554 B1 | 2/2016 | Bertagnolli et al. | |
| 2008/0302579 A1 * | 12/2008 | Keshavan | C22C 26/00 175/434 |
| 2009/0305039 A1 | 12/2009 | Sumiya | |
| 2010/0083583 A1 | 4/2010 | Sumiya et al. | |
| 2010/0104874 A1 | 4/2010 | Yong et al. | |
| 2010/0294571 A1 * | 11/2010 | Belnap | E21B 10/567 423/446 |
| 2012/0034464 A1 * | 2/2012 | Chakraborty | B82Y 30/00 428/402 |
| 2014/0186629 A1 | 7/2014 | Ikeda et al. | |
| 2015/0033637 A1 | 2/2015 | Naidoo | |
| 2015/0107163 A1 | 4/2015 | Konovalov | |
| 2015/0114726 A1 | 4/2015 | Shen et al. | |
| 2015/0246427 A1 | 9/2015 | Can | |

FOREIGN PATENT DOCUMENTS

| | | |
|---|---|---|
| GB | 2459272 A | 10/2009 |
| JP | 2012140256 A | 7/2012 |
| JP | 2015030817 A | 2/2015 |
| KR | 100657798 B1 | 12/2006 |
| WO | WO9912867 A1 | 3/1999 |

OTHER PUBLICATIONS

International Preliminary Report on Patentability issued in International Patent application PCT/US2017/039180, dated Jan. 1, 2019, 11 pages.

International Search Report and Written Opinion issued in International Patent application PCT/US2017/039180 dated Sep. 11, 2017, 15 pages.

Sneddon et al., Polycrystalline diamond: manufacture, wear mechanisms, and implications for bit design, Journal of Petroleum Technology; Issue 40, vol. 12, Dec. 1988, pp. 1593-1601.

* cited by examiner

POLYCRYSTALLINE DIAMOND CONSTRUCTIONS

CROSS-REFERENCE TO RELATED APPLICATION

This application claims priority to and the benefit of U.S. Provisional Application No. 62/355,434, filed on Jun. 28, 2016, the entirety of which is incorporated herein by reference.

BACKGROUND

Polycrystalline diamond (PCD) materials known in the art are formed from diamond grains or crystals and a sintering aid, and are synthesized by high pressure/high temperature (HP/HT) processes. Such PCD materials are known for having a high degree of wear resistance, making them a popular material choice for use in industrial applications such as cutting tools for machining and wear and cutting elements in subterranean mining and drilling where such high degree of wear resistance is desired. In such applications, conventional PCD materials can be provided in the form of a surface layer or a material body of, for example, a cutting element used with cutting and drilling tools, to impart desired levels of wear resistance.

Traditionally, PCD cutting elements used in such applications are formed by applying one or more layers of such PCD-based material to, or forming a body of such PCD-based material, for attachment with a suitable substrate material. Example PCD cutting elements known can include a substrate, a PCD surface layer or body, and optionally one or more transition or intermediate layers to improve the bonding between and/or provide transition properties between the PCD surface layer or body and the underlying substrate support layer. Substrates used in such cutting element applications include carbides such as cemented tungsten carbide (WC—Co).

SUMMARY

In some embodiments, polycrystalline diamond constructions as disclosed herein are formed from a mixture of diamond grains including a first volume of fine-sized diamond grains having an average grain size of from about 0.01 to 6 micrometers, and a second volume of coarse-sized diamond grains having an average grain size of greater than 6 micrometers. The fine-sized diamond grains are partially graphitized, and the coarse-sized diamond grains are not graphitized. The mixture of diamond grains may further include a sintering aid, wherein a population of the sintering aid may be fused together with the partially graphitized fine-sized diamond grains. In an example, the mixture include a minority volume content of the fine-sized diamond grains, and a majority content of the coarse-sized diamond grains based on the total volume of the first and second volumes of diamond grains.

In some embodiments, the polycrystalline diamond construction is formed by subjecting the mixture of diamond grains to a high pressure/high temperature sintering process condition in the presence of the sintering aid. The resulting polycrystalline diamond construction includes bonded-together diamond grains, wherein the bonded-together diamond grains include the coarse-sized diamond grains that are mostly bonded together with one another, and the fine-sized diamond grains mostly interposed within interstitial regions existing between the bonded-together coarse-sized diamond grains. Contact areas between coarse-sized diamond grains in the polycrystalline diamond construction are substantially free of graphite. The interstitial regions may or may not include the sintering aid. The polycrystalline diamond construction may include a metallic substrate attached thereto.

In some embodiments, polycrystalline diamond constructions as disclosed herein may be formed by combining a volume of the fine-sized diamond grains with a sintering aid and subjecting the volume of fine-sized diamond grains and sintering aid to conditions suitable for partially graphitizing the fine-sized diamond grains. The partially graphitized fine-sized diamond grains are combined with coarse-sized diamond grains that are substantially free of graphite, or non-graphitized, to form a mixture. The mixture is subjected to the high pressure/high temperature process conditions to sinter the diamond grains to form the polycrystalline diamond construction.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

These and other features and advantages of PCD construction as disclosed herein will become appreciated as the same becomes better understood with reference to the specification, claims and drawings wherein:

DETAILED DESCRIPTION

Figure 1:
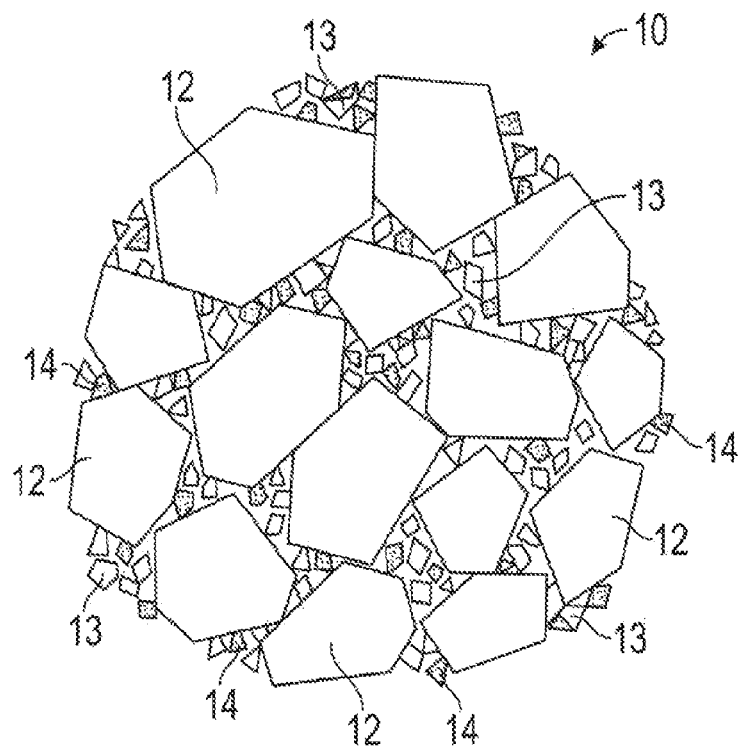
FIG. 1 is a schematic view of a diamond grain composition prepared according to an embodiment of the application.

As used in this specification, the term polycrystalline diamond, along with its abbreviation "PCD," is used herein to refer to the resulting material produced by subjecting individual diamond crystals or grains and a sintering aid to sufficiently high pressure and high temperature conditions that causes intercrystalline bonding to occur between adjacent diamond crystals to form a network of bonded together diamond crystals. PCD materials as disclosed herein are engineered to display an enhanced degree of bonding between the diamond grains, and an enhanced structural uniformity, thereby resulting in properties of high strength and high wear resistance when compared to conventional PCD materials.

Conventional attempts to improve the strength and wear resistance of PCD materials have focused on the use of diamond grains having a multimodal particle size distribution, including the use of submicron-sized diamond grains to obtain a higher diamond fraction or content and more intense bonding of diamond crystals in the resulting PCD material. A driving force of diamond crystal intergrowth in such conventional attempts depends on increasing the degree of solubility of carbon atoms in the sintering aid used for sintering. As in the pressure-temperature (P-T) region of diamond stability the solubility of carbon atoms from graphite into the sintering aids is higher, the partial graphitization of diamond grains substantially increases the driving force of diamond crystal intergrowth. On the other hand, graphite areas on the surface of diamond grains could be trapped between adjacent grains at the stage of applying high pressure beyond the reach of the sintering aid and, as a result, such graphite areas may remain in the final product after sintering as a part of grain boundaries. The presence of such graphite areas at diamond grain boundaries can significantly decrease both strength and wear resistance of PCD materials.

Embodiments of the present application include PCD constructions made in a manner that drives improved intercrystalline bonding while minimizing the density of unwanted grain boundary defects to produce a PCD material having improved levels of diamond bonding and structural uniformity. This is achieved in some embodiments by selective partial graphitization of certain diamond grains combined with no graphitization of other diamond grains. In an example, such partial graphitization occurs prior to sintering the diamond grains at high pressure/high temperature conditions. Specifically, in an example, it is desired that the diamond grains that are partially graphitized have a finer grain size than non-graphitized diamond grains.

Example fine-sized diamond grains useful in this regard for partial graphitization include those having a submicrometer average particle size, for example, from about 0.1 to 6 micrometers, from about 0.8 to 4 micrometers, or from about 1 to 3 micrometers. The fine-sized diamond grains that are partially graphitized may have a single particle size distribution or may have a multimodal particle size distribution depending on the particular end-use application and desired PCD composition properties. In an example, the fine-sized diamond grains may comprise two particle size distributions, a first one having a submicrometer particle size, and a second one having an average particle size from about 2 to 6 micrometers.

As used here, the term "partial" as used to qualify the extent of the fine-sized diamond grains graphitization is understood to mean that the fine-sized diamond grains are not completely graphitized, i.e., the fine-sized diamond grains are not completely converted to graphite. Diamond grains graphitized as disclosed herein means that from about 2 to 60 percent of the total volume of the diamond grains have been converted to graphite and/or to some other non-diamond forms of carbon, for example, from about 5 to 40 percent or from about 10 to 30 percent.

The fine-sized diamond grains may be partially graphitized by any technique known to graphitize diamond grains. In an example, the fine-sized diamond grains are graphitized by subjecting the fine-sized diamond grains to elevated temperature, such as by heating at a temperature of from about 700 to 1,400° C. in an inert or a vacuum atmosphere. As noted, while a particular method of graphitizing has been disclosed, it is to be understood that all methods known in the art for partially graphitizing diamond grains are considered to be within the scope of this disclosure. Fine-sized diamond grains may be graphitized under different conditions and using different graphitizing agents useful for providing the desired partially graphitized diamond grains, for example, the partial graphitization may be promoted by the use of a graphitizing agent such as a diamond sintering aid, a gas containing oxygen, and the like.

In an example, it is desired that the fine-sized diamond grains be partially graphitized in the presence of a sintering aid, which promotes sintering the diamond grains into PCD during a HP/HT process, as well as graphitization of diamond at normal pressure and high temperature. In an example, the sintering aid may be selected from the group of solvent metal catalysts useful for sintering PCD, such as the metals from Group VIII of the Periodic table. Example sintering aids include but are not limited to cobalt, nickel, iron, manganese, and combinations and/or alloys thereof. In an example, cobalt is used as the sintering aid.

In an example, the sintering aid for graphitizing may be provided in the form of a powder that is mixed together or otherwise combined with the fine-sized diamond grains before being subjected to the process conditions useful for achieving partial graphitization. In another example, the fine-sized diamond grains may be coated with the sintering aid instead being mixed with it. Coating the fine-sized diamond grains with the sintering aid for subsequent partial graphitization may operate to provide a more uniform distribution of the sintering aid in the mass of the fine-sized diamond grains and more extensive contact between materials, which may result in both a more intense graphitization during the graphitizing process, and provide a more intense recrystallization process during a subsequent HP/HT sintering condition. In another embodiment, the fine-sized diamond grains may be both coated with the sintering aid and mixed with the same or different sintering aid. In an example, the sintering aid may have a particle size that is about the same or less than that of the fine-sized diamond grains.

In an example, the amount of sintering aid combined with the fine-sized diamond grains, e.g., coated, mixed, or a combination thereof, may be an amount sufficient for the partial graphitization of the fine-sized diamond grains but not sufficient for the following sintering of all diamond grains into the PCD material. In this case an additional amount of sintering aid may be useful to facilitate sintering of the diamond grains during a HP/HT process. In an example, any additional sintering aid useful for sintering the volume of diamond grains including both partially graphitized fine-sized diamond grains and non-graphitized diamond grains during a HP/HT process and/or attaching the resulting PCD material to a substrate may be added in the form of powder or the like before sintering, or may be infiltrated into the diamond grains during a HP/HT process from a substrate, e.g., a metallic substrate such as WC—Co including a sintering aid constituent. In the event that additional sintering aid is added to the diamond volume for sintering, in the form of a mixture or by infiltration, such additional sintering aid may be the same or different from that used to partially graphitize the fine-sized diamond grains.

In an example where the volume of diamond powder is mixed with the sintering aid for purposes of sintering, the weight content of the sintering aid may be from about 0.5 to 20 percent, or from about 1 to 5 percent by weight of the total weight of the resulting PCD material. In an example where all or a part of the sintering aid used for sintering of the diamond volume by a HP/HT process is provided by infiltration from an external source or a substrate, the weight content of the sintering aid may be greater than about 5 percent, from about 6 to 20 percent, and from about 8 to 15 percent by weight of the total weight of the resulting PCD material.

The fine-sized diamond grains that are partially graphitized are combined with non-graphitized diamond grains forming a diamond volume for sintering during HP/HT processing, according to an embodiment of the application. In an example, the partially graphitized fine-sized diamond grains may be from about 2 to 50 percent by weight, 5 to 30 percent by weight, and from about 10 to 25 percent by weight of the total weight of the diamond grains used to form the PCD construction. In an example embodiment, the non-graphitized diamond grains that are combined with the partially-graphitized fine-sized diamond grains have larger size than the partially-graphitized fine-sized diamond grains, and may have an average particle size of greater than about 8 micrometers, and are referred to as coarse-sized diamond grains.

In an example, the coarse-sized diamond grains may have a particle size of from about 8 to 100 micrometers, in the range of from about 10 to 50 micrometers, and in the range of from about 12 to 30 micrometers. The coarse-sized diamond grains may have a monomodal particle size distribution or a multimodal particle size distribution depending on the particular source and/or the particular end-use application. In an example, the coarse-sized diamond grains that are used may have a particle size distribution of between about 8 to 16 micrometers, or between about 10 to 22 micrometers, or between about 12 to 30 micrometers. While particular size distributions for the coarse-sized diamond grains have been presented, it is to be understood that the width or narrowness of such particle size distribution or "cut" can and will vary depending on the particular source, and are all understood to be included within the scope of this disclosure.

PCD constructions as disclosed herein may be prepared by partially graphitizing a volume of fine-sized diamond grains in the manner described above and then combining the partially-graphitized diamond grains with a volume of coarse-sized diamond grains to obtain a total diamond volume. Sintering aid may be added to the total diamond volume to promote sintering or the sintering aid for sintering may be provided by an infiltration substrate. While the diamond volume is disclosed as being in powder form for HP/HT processing, it is to be understood that the diamond volume may be provided in the form of a green-state part such as a tape or the like, wherein the diamond grains are bound together by a suitable binder material, for purposes of forming a PCD material having a particular shape suited for an end-use application. For example, when used to form a working surface on a subterranean drill bit cutting or wear element, the diamond volume or mixture may be formed into a shape that will cover a surface portion of or form a PCD body of the cutting element. In another embodiment, the diamond volume or mixture can be configured in the shape of the entire cutting element.

The total diamond volume and any sintering aid, in powder or green-state form, is then loaded into a suitable container or vessel for placement into an HP/HT device. Another source of sintering aid or a substrate may be positioned adjacent the total diamond volume for purposes of providing a sintering aid and/or for purposes of providing a PCD construction including a substrate for attachment of the PCD construction for a particular end-use application. Suitable materials useful as substrates for forming PCD constructions include those conventionally used as substrates for conventional PCD compacts for the purpose of attaching the compact to a cutting or wear tool.

Suitable substrate materials include those formed from metallic materials, ceramic materials, cermet materials, and combinations thereof. In an example embodiment, the substrate is provided in a preformed state. In another embodiment, the substrate can be provided in the form of a mixture of substrate precursor powders, or can be provided in the form of a green-state part. In an example embodiment, the substrate includes a sintering aid in the form of a metal solvent that is capable of infiltrating into the adjacent diamond powder volume during processing to facilitate diamond-to-diamond bonding to form the PCD body, and to provide its attachment to the substrate. Suitable metal solvents include those discussed above in reference to the sintering aid. In an embodiment, the metal solvent is Co and the substrate material comprises WC—Co.

In an example where the diamond volume is provided in the form of a green-state part, a preheating process may be needed prior to sintering to dewax or drive off the binding agent prior to sintering. The HP/HT device is then operated to provide the temperature and pressure conditions useful for sintering the volume of diamond grains into a PCD material and attach or join the PCD material to any adjacent substrate. In an example, the HP/HT device is controlled so that the container is subjected to a HP/HT process including a pressure in the range of from 5 to 7 GPa and a temperature in the range of from about 1,320 to 1,600° C., for a period of time from about 50 to 500 seconds.

In an embodiment, PCD constructions as produced according to the method disclosed herein have a material microstructure that is characterized by an intercrystalline diamond bonded phase or matrix of bonded-together coarse-sized diamond grains, and a plurality of interstitial regions dispersed within the matrix between the coarse-sized bonded diamond grains including the remaining fine-sized diamond grains and the sintering aid. Because the fine-sized diamond grains were partially graphitized prior to the sintering process, while the coarse-sized diamond grains were not, the bonds or contact areas between the coarse-sized diamond grains in the PCD construction are substantially free of or do not include any spots of graphite, thereby resulting in a PCD construction having improved strength and wear resistance, according to an embodiment.

Accordingly, in an embodiment, PCD constructions as disclosed herein eliminate the negative consequences associated with those conventional attempts to increase diamond crystal intergrowth as disclosed above, such negative consequences being the graphitization of coarse-sized diamond grains that results in decreased strength and wear resistance of the PCD material. PCD constructions as disclosed herein not only avoid graphitization of the coarse-sized diamond grains, but achieve more extended bonding between them due to a more intense process of growth of grain boundaries as the result of easier dissolving of carbon atoms from partially graphitized fine diamond grains in the sintering aid.

PCD constructions as disclosed herein may have a diamond volume content of greater than about 85 percent, and from about 93 to 99 percent by volume, depending on the particular end-use application. If desired, PCD constructions as disclosed herein may comprise two or more different layers or regions each having a different diamond volume content wherein at least one of the layers comprises a PCD material as disclosed above. In an example, such PCD construction may have a first PCD layer or region near a surface of the construction having a first diamond volume content, and a second PCD layer or region beneath the first PCD layer having a second diamond volume content different from the first one, e.g., wherein the first diamond volume content is greater than the second diamond volume content. In an example, the first PCD layer may be formed from the PCD material as disclosed herein, and the second PCD layer may be formed from diamond grains with different sizes and/or degree of partial graphitization, and/or different sintering aid content, or may be a conventional PCD material. It is to be understood that these are but a few examples of PCD constructions including different PCD layers or regions, and other examples including the same are understood to be within the scope of this disclosure.

If desired, PCD constructions as disclosed herein may have diamond volume content that changes within the PCD body, where such change in diamond volume content may be provided in the form of a step change or can be provided in the form of a gradient change depending on the desired end use mechanical properties of the body to accommodate the particular end use application. Thus, it is to be understood that PCD constructions as disclosed herein may comprise a constant diamond volume content throughout, or can be constructed including one or more regions having a changing or different diamond volume content.

FIG. 1 illustrates a schematic view of diamond grain composition 10 as disclosed herein including coarse-sized diamond grains 12, and partially-graphitized fine-sized diamond grains 13 and sintering aid 14 disposed between the coarse-sized diamond grains 12, according to an embodiment of the application.

Figure 2:
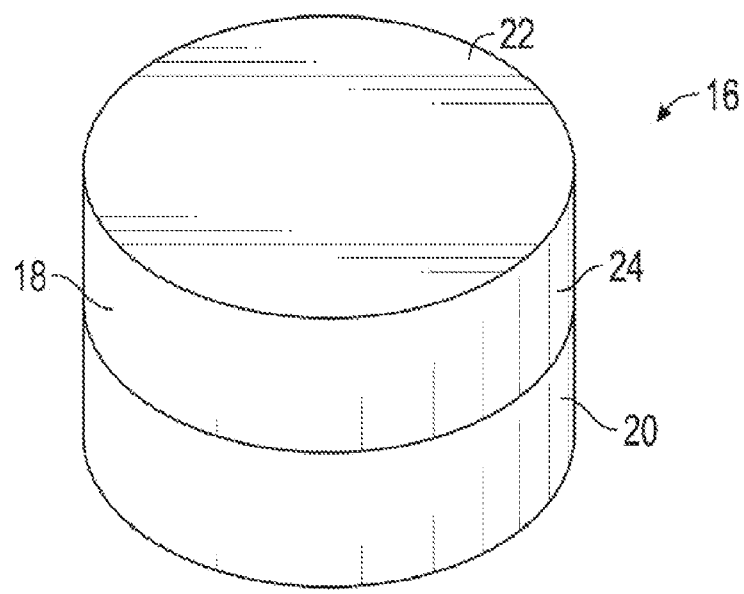
FIG. 2 is perspective side view of a PCD construction including the PCD material of FIG. 1 joined to a substrate, according to an embodiment of the application.

FIG. 2 illustrates a PCD construction 16 as disclosed herein including a PCD body 18, made from the PCD material described above, integrally joined to a substrate 20. In this example, the PCD construction 16 has a generally planar working surface 22 positioned along a top portion of the PCD body. It is to be understood that PCD constructions as disclosed herein, including a PCD body attached to a substrate, may have a nonplanar interface between a PCD body and a substrate and all such nonplanar interface geometries are understood to be within the scope of PCD constructions as disclosed herein. Additionally, depending on the particular use application, all or part of the side surface 24 of the PCD body may also serve as a working surface. While a particular example PCD construction has been illustrated, namely, one having a generally flat working surface and a cylindrical outside wall surface, it is to be understood that the particular configuration of PCD construction can and will vary depending on the particular end-use application, and such variations in configuration are intended to be within the scope of this disclosure.

Once formed, the PCD construction may be treated for rendering a desired region, or the entire PCD construction, relatively more thermally stable. In an example, where a particular region of the PCD construction is to be treated to be thermally stable, such thermally stable region may extend a partial depth from a working surface 22 and/or 24 of the PCD body. This treatment can be performed, for example, by removing substantially all of the sintering aid from the selected region by suitable process, e.g., by acid leaching, aqua regia bath, electrolytic process, or combinations thereof. In another embodiment, rather than actually removing the sintering aid from the targeted region of the PCD body, the targeted region can be rendered thermally stable by treating the sintering aid in a manner that reduces or eliminates the potential for the sintering aid to adversely impact the intercrystalline bonded diamond within this region at elevated temperatures.

For example, the sintering aid can be combined chemically with another material to cause it to no longer act as a promoter of diamond graphitization at high temperatures, or can be transformed or reacted into another material that again causes it to no longer act as a promoter of diamond graphitization. Accordingly, as used herein, the terms "removing substantially all" or "substantially free" as used in reference to the sintering aid is intended to include the different methods in which the PCD body can be treated with respect to the sintering aid so as to no longer adversely impact the intercrystalline diamond in the PCD body or compact at high temperature.

In an example where a partial region of the PCD body is rendered thermally stable, such thermally stable region extends a determined depth from a surface of the PCD body, e.g., a working, wear or cutting surface, independent of the working or cutting surface orientation. Again, it is to be understood that the working or cutting surface may include more than one surface portion of the PCD body. The exact depth of the thermally stable region within the PCD body can and will vary depending on a number of factors such as the particular end use application, and the diamond volume content or density in the region of the PCD body to be treated.

In an example, a desired degree of thermal stability providing performance properties suitable for certain end-use application may be achieved from a thermally stable region that extends from a working, wear or cutting surface of the PCD body an average depth of less than about 0.7 mm, less than about 0.6 mm, and less than about 0.4 mm. In such example, the thermally stable region may extend from at least a portion of the working, wear or cutting surface an average depth of from about 0.2 mm to about 0.6 mm, and from about 0.3 mm to about 0.5 mm. For other more extreme end-use applications, a desired degree of thermal stability may be achieved from a thermally stable region that extends from a working, wear or cutting surface of the PCD body an average depth of greater that 0.7 mm, from about 0.7 mm to about 1 mm or greater.

It is to be understood that the depth of the thermally stable region from the working or cutting surface is represented as being a nominal, average value arrived at by taking a number of measurements at preselected intervals along this region and then determining the average value for all of the points. The region remaining within the PCD body or compact beyond this thermally stable region is understood to still contain the sintering aid.

Additionally, when the PCD body to be treated is attached to a substrate, it is desired that the selected depth of the region to be rendered thermally stable be one that allows a sufficient depth of sintering aid-containing region remaining in the PCD body to not adversely impact the attachment or bond formed between the PCD body and the substrate, e.g., by sintering aid infiltration, during the HP/HT process. In an example, it is desired that the untreated or remaining region within the PCD body has a thickness that is sufficient to maintain a desired bond strength between the PCD body and substrate. In an example embodiment, the untreated region within the PCD body may extend a distance of at least about 0.01 mm as measured from the substrate. It is, however, understood that the exact thickness of the PCD region containing the sintering aid adjacent the substrate can and will vary depending on the diamond particle size and diamond density of the PCD body and the intended use application.

In an example embodiment, the selected region of the PCD body is rendered thermally stable by removing substantially all of the sintering aid therefrom by exposing the desired working surface or surfaces to an acid leaching agent. Generally, after the PCD body or compact is made by a HP/HT process, the identified surface or surfaces, e.g., the working, wear or cutting surfaces, are placed into contact with the acid leaching agent for a sufficient period of time to produce the desired leaching or sintering aid depletion depth. In an example, suitable leaching agents include hydrofluoric acid (HF), hydrochloric acid (HCl), nitric acid ($HNO_3$), and mixtures thereof.

Figure 3:
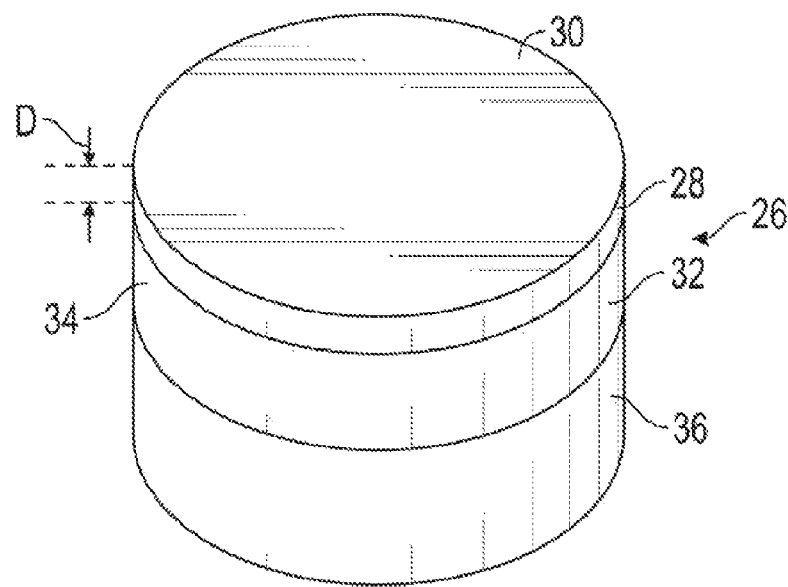
FIG. 3 is a perspective side view of the PCD construction of FIG. 2 after it has been treated to render a region extending a depth from a working surface thermally stable, according to an embodiment of the application.
Figure 4:
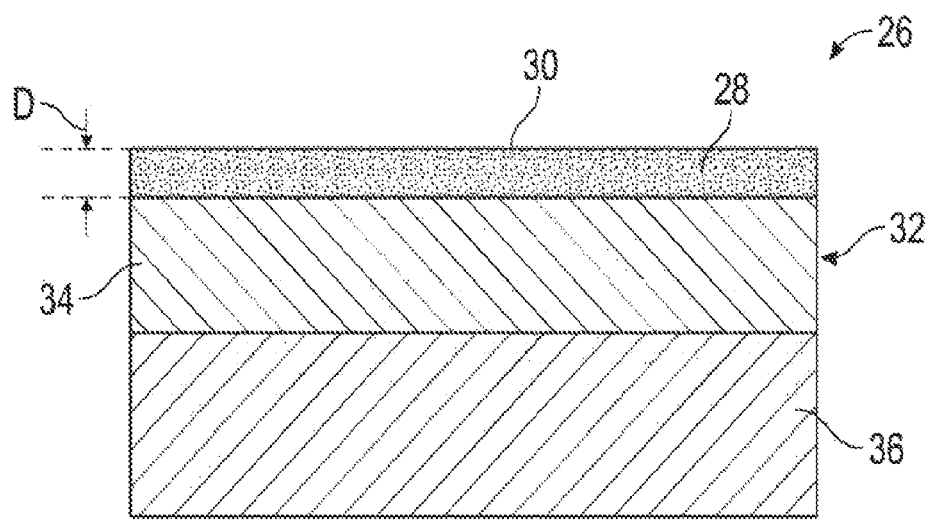
FIG. 4 is a cross-sectional side view of the PCD construction of FIG. 3, according to an embodiment of the application.

FIGS. 3 and 4 illustrate an embodiment of a PCD construction as disclosed herein after it has been treated to render a selected region of the PCD body thermally stable. In this example, the PCD construction 26 comprises a thermally stable region 28 that extends a selected depth "D" from a working or cutting surface 30 of the PCD body 32. The remaining region 34 of the PCD body 32, extending from the thermally stable region 28 to the substrate 36, includes the sintering aid.

Figure 5:
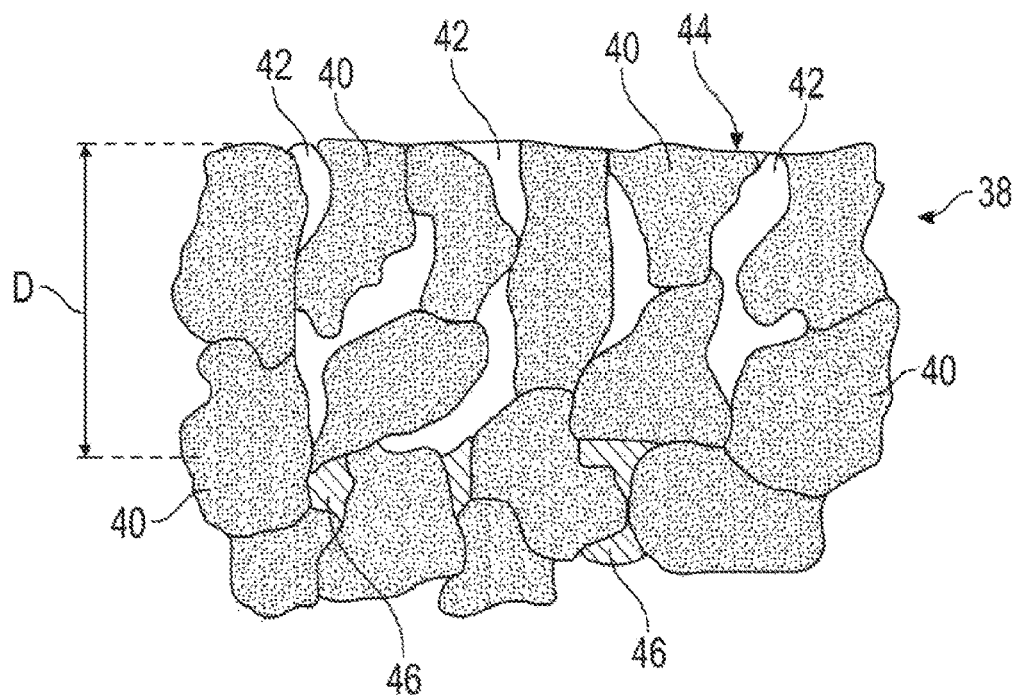
FIG. 5 is a schematic view of a portion of the PCD material microstructure of the PCD construction of FIG. 3 taken adjacent the working surface, according to an embodiment of the application.

FIG. 5 illustrates in cross section the material microstructure 38 of the PCD body as disclosed herein and, more specifically, a section of the microstructure that includes the thermally stable region of the PCD body. The thermally stable region comprises polycrystalline diamond including the plurality of bonded together diamond grains 40, and a network of interstitial regions 42 between the diamond grains that are now substantially free of the sintering aid. The thermally stable region including the interstitial regions free of the sintering aid is shown to extend a distance or depth "D" from a working or cutting surface 44 of the PCD body. In an example embodiment, the depth "D" is identified and measured by cross sectioning a part, e.g., a PCD compact, including the PCD body and using a sufficient level of magnification to identify the interface between the first and second regions and taking an average of the measurements.

The so-formed thermally stable region of the PCD body of this application is not subject to the thermal degradation encountered in conventional PCD, resulting in improved thermal characteristics. The remaining region of the PCD body extending from depth "D" has a material microstructure that comprises PCD, as described above and illustrated in FIG. 1, that includes sintering aid 46 disposed within the interstitial regions.

As noted above, the location, size and orientation of the working, wear or cutting surface on the PCD body formed from PCD materials as disclosed herein can and will vary depending on the particular working, wear or cutting application. In an example, where the PCD body is provided as part of a PCD construction configured as a cutting element for use in a subterranean drill bit, the working, wear or cutting surface can extend beyond the upper surface of the PCD body illustrated in FIG. 4, and along a portion of or along an entire side surface of the body.

PCD constructions as disclosed herein may be treated to render the entire PCD body or layer thermally stable, in which case the entire PCD body or layer is subjected to the types of treatments disclosed above for either removing the sintering aid from the body or otherwise rendering it inactive for diamond graphitization. In such example, any substrate used for making the PCD construction may be removed before or during the treatment process and, if desired, a further substrate may be attached to the PCD body after it has been rendered thermally stable to meet the attachment needs of a particular-end use application. The further substrate may be formed from the same types of materials noted above, and may be attached to the thermally stable PCD body by a HP/HT process or by other process sufficient to provide the desired attachment with the PCD body.

PCD materials and constructions as disclosed herein may be used for a number of different applications, such as for forming cutting and/or wear elements of tools used for mining, cutting, machining and construction applications, where the combined properties of high strength and high wear resistance are highly desired. PCD constructions as disclosed herein are particularly well suited for forming working, wear and/or cutting surfaces on components used in machine tools and subterranean drill and mining bits such as roller cone rock bits, percussion or hammer bits, diamond bits, and shear cutters.

Figure 6:
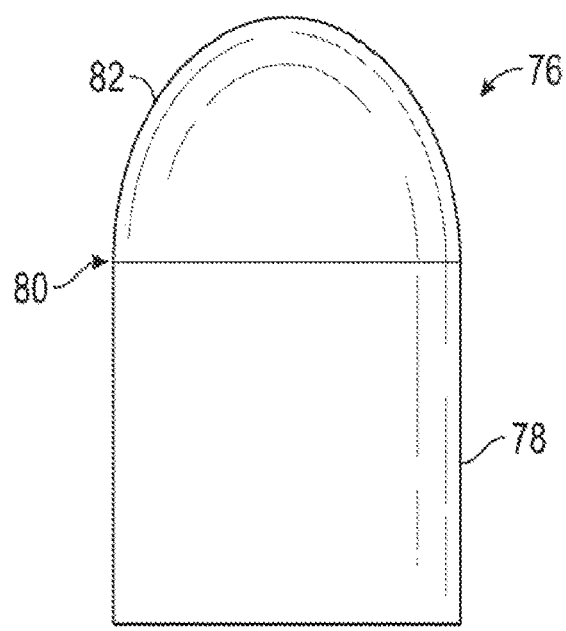
FIG. 6 is a perspective side view of a PCD construction in the form of a cutting insert, according to an embodiment of the application.

FIG. 6 illustrates an embodiment of a PCD body provided in the form of an insert 76 used in a wear or cutting application in a roller cone drill bit or percussion or hammer drill bit. For example, such PCD inserts 76 are constructed having a substrate 78, formed from one or more of the substrate materials disclosed above, that is attached to a PCD body 80 formed from the PCD material using the partially-graphitized fine-sized diamond grains. In this particular embodiment, the insert 76 comprises PCD body having a domed working surface 82. The insert 76 can be pressed or machined into the desired shape. It is to be understood that PCD constructions as disclosed herein may also be used to form inserts having geometries other than that specifically described above and illustrated in FIG. 6.

Figure 7:
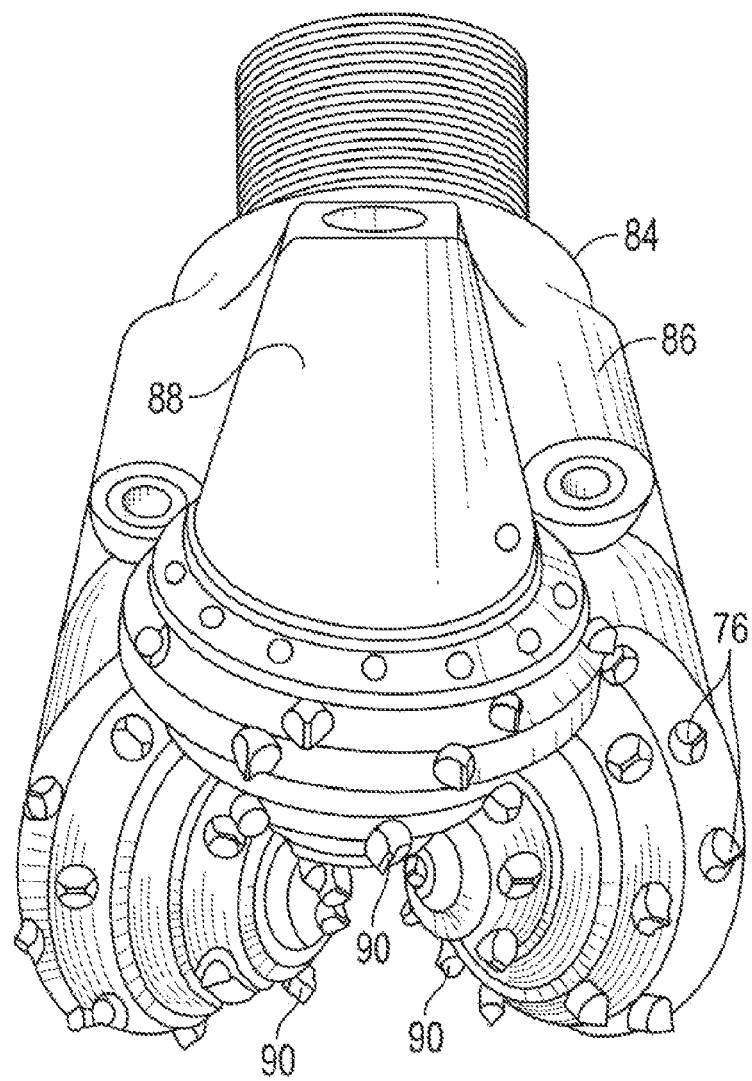
FIG. 7 is a perspective side view of a roller cone drill bit including a number of the cutting inserts of FIG. 6.

FIG. 7 illustrates a rotary or roller cone drill bit in the form of a rock bit 84 including a number of the wear or cutting PCD inserts 76 disclosed above and illustrated in FIG. 6. The rock bit 84 comprises a body 86 having three legs 88 extending therefrom, and a roller cutter cone 90 mounted on a lower end of each leg. The inserts 76 are the same as those described above including the PCD body formed from the PCD material as discussed herein, and are provided in the surfaces of each cutter cone 90 for bearing on a rock formation being drilled.

Figure 8:
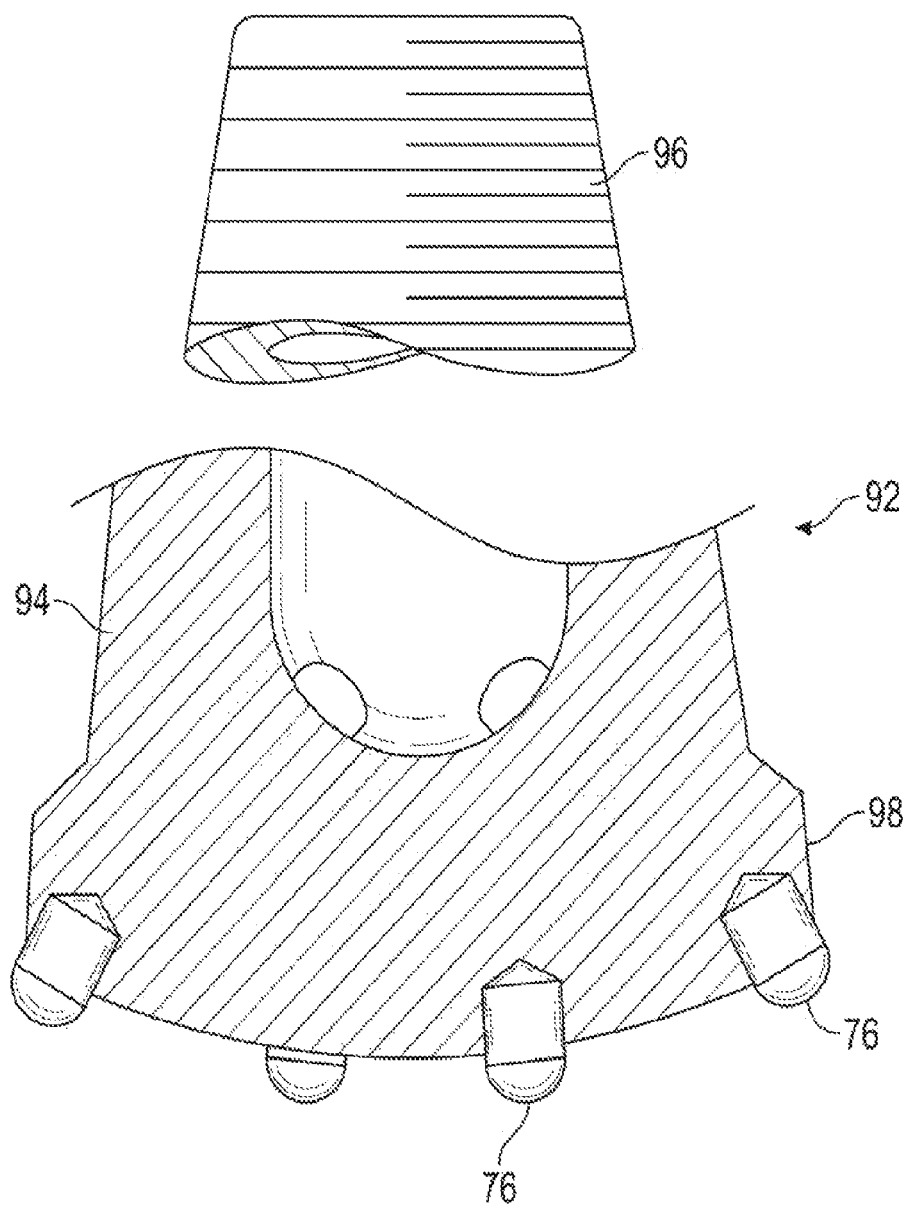
FIG. 8 is a perspective side view of a percussion or hammer bit including a number of the cutting inserts of FIG. 6.

FIG. 8 illustrates the PCD insert described above and illustrated in FIG. 6 as used with a percussion or hammer bit 92. The hammer bit generally comprises a hollow steel body 94 having a threaded pin 96 on an end of the body for assembling the bit onto a drill string (not shown) for drilling oil wells and the like. A plurality of the inserts 76 are provided in the surface of a head 98 of the body 94 for bearing on the subterranean formation being drilled.

Figure 9:
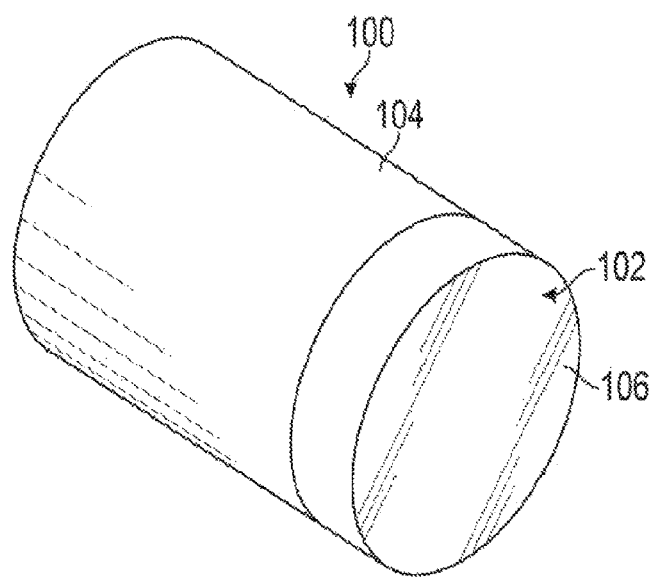
FIG. 9 is a perspective view of a PCD construction in the form of a shear cutter, according to an embodiment of the application.

FIG. 9 illustrates a PCD construction as disclosed herein in the form of a shear cutter 100 used, for example, with a drag bit for drilling subterranean formations. The PCD shear cutter 100 comprises a PCD body 102 that is sintered or otherwise attached to a cutter substrate 104 as described above. The PCD body 102 includes a working or cutting surface 106 that is formed from the PCD material disclosed made using the partially-graphitized small-sized diamond grains. As discussed and illustrated above, the working or cutting surface for the shear cutter can extend from the upper surface to a beveled surface defining a circumferential edge of the upper surface. It is to be understood that PCD constructions as disclosed herein can be used to form shear cutters having geometries other than that specifically described above and illustrated in FIG. 9.

Figure 10:
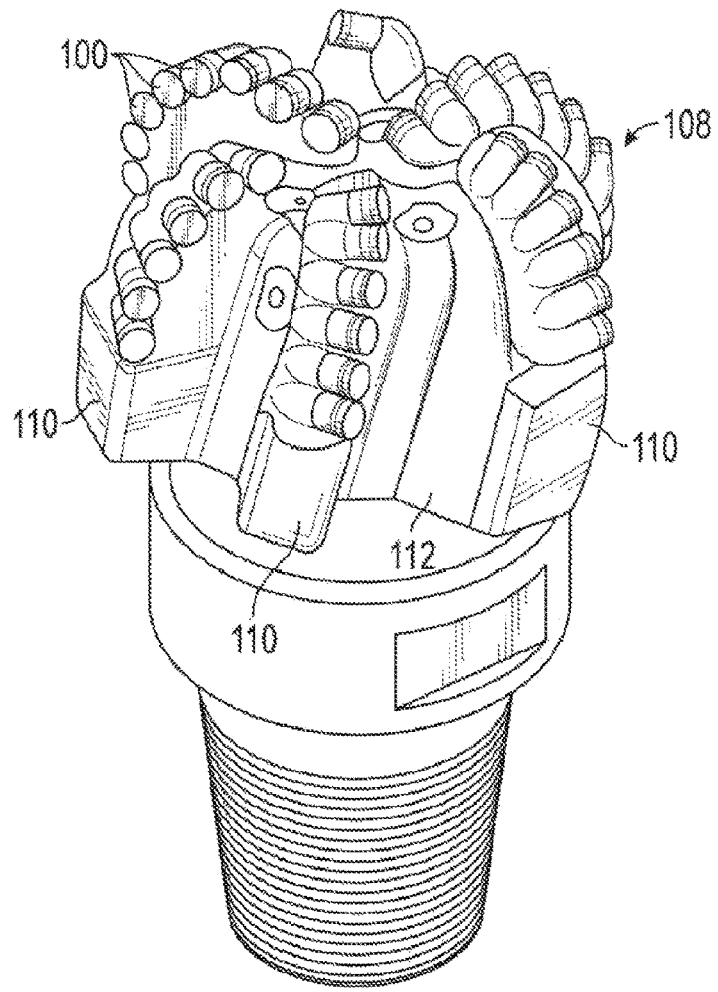
FIG. 10 is a perspective side view of a drag bit including a number of the shear cutters of FIG. 9.

FIG. 10 illustrates a drag bit 108 including a plurality of the PCD shear cutters 100 described above and illustrated in FIG. 9. The shear cutters are each attached to blades 110 that extend from a head 112 of the drag bit for cutting against the subterranean formation being drilled. Because the PCD shear cutters of this application include a metallic substrate, they are attached to the blades by conventional method, such as by brazing or welding.

Although only a few example embodiments of PCD constructions, method for making the same, and devices including the same have been described in detail above, those skilled in the art will readily appreciate that many modifications are possible in the example embodiments without materially departing from the concepts as disclosed herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means plus function type claiming for any limitations of any of the claims herein, except for those in which the claim expressly uses the words 'means for' together with an associated function.

What is claimed is:

1. A diamond grain composition for sintering polycrystalline diamond constructions comprising:
    a first volume of fine-sized diamond grains having an average grain size of from about 0.01 to 6 micrometers, wherein the fine-sized diamond grains are partially graphitized;
    a second volume of coarse-sized diamond grains having an average grain size of greater than 6 micrometers, wherein the coarse-sized diamond grains are not graphitized; and
    a sintering aid, wherein a population of the sintering aid is fused together with the partially graphitized fine-sized diamond grains.

2. The diamond grain composition as recited in claim 1 wherein the sintering aid is selected from the group consisting of iron, cobalt, nickel, manganese, and combinations thereof.

3. The diamond grain composition as recited in claim 1 wherein the composition comprises about 2 to 50 percent by volume of the fine-sized diamond grains based on the total volume of the first and second volumes of diamond grains.

4. The diamond grain composition as recited in claim 1 wherein the composition comprises a minority volume content of the fine-sized diamond grains, and a majority content of the coarse-sized diamond grains based on the total volume of the first and second volumes of diamond grains.

5. A polycrystalline diamond construction formed by subjecting the diamond grains composition of claim 1 to high pressure/high temperature sintering process conditions.

6. The polycrystalline diamond construction as recited in claim 5 wherein contact areas between coarse-sized diamond grains in the polycrystalline diamond construction are substantially free of graphite.

7. A polycrystalline diamond construction comprising:
    a polycrystalline diamond body comprising bonded-together diamond grains, wherein the bonded-together diamond grains comprise coarse-sized diamond grains that are mostly bonded together with one another and fine-sized diamond grains mostly interposed within interstitial regions existing between the bonded-together coarse-sized diamond grains, wherein the interstitial regions comprise a sintering aid, wherein the fine-sized diamond grains used to form the construction are partially graphitized before sintering, wherein a population of the sintering aid is fused together with the partially graphitized fine-sized diamond grains, and wherein contact areas between the coarse-sized diamond grains are substantially free of graphite.

8. The polycrystalline diamond construction as recited in claim 7 wherein the polycrystalline diamond body comprises from about 2 to 50 percent by volume fine-sized diamond grains based on the total volume of the fine- and coarse-sized diamond grains.

9. The polycrystalline diamond construction as recited in claim 7 wherein the fine-sized diamond grains have an average particle size of between about 0.1 to 6 micrometers, and wherein the diamond coarse-sized diamond grains have an average particle size of greater than 8 micrometers.

10. A bit for drilling subterranean formations comprising a body and a number of cutting elements operatively connected with the body, wherein the cutting elements comprise the polycrystalline diamond construction as recited in claim 7, and wherein a metallic substrate is jointed together with the diamond body.

11. The polycrystalline diamond construction as recited in claim 7 wherein the sintering aid is selected from the group consisting of iron, cobalt, nickel, manganese, and combinations thereof.

12. The polycrystalline diamond construction as recited in claim 7 wherein the polycrystalline diamond body comprises a minority volume content of the fine-sized diamond grains, and a majority content of the coarse-sized diamond grains based on the total volume of the fine- and coarse-sized diamond grains.

13. A method for making a polycrystalline diamond construction comprising:
    combining a volume of fine-sized diamond grains with a sintering aid;
    subjecting the volume of fine-sized diamond grains and sintering aid to conditions suitable for partially graphitizing the fine-sized diamond grains;
    combining the partially graphitized fine-sized diamond grains with coarse-sized diamond grains that are substantially free of graphite to form a mixture; and
    subjecting the mixture to high pressure/high temperature process conditions to sinter the diamond grains to form polycrystalline diamond.

14. The method as recited in claim 13 wherein:
    during combining the volume of fine-sized diamond grains with the sintering aid, the sintering aid material is in the form of grains mixed together with the fine-sized diamond grains; or
    combining the volume of fine-sized diamond grains with the sintering aid comprises providing the sintering aid as a coating on an outside surface of the fine-sized diamond grains.

15. The method as recited in claim 13 wherein subjecting the volume of fine-sized diamond grains to graphitization conditions comprises exposing the fine-sized diamond grains to an elevated temperature of from about 700 to 1,400° C.

16. The method as recited in claim 13 wherein the fine-sized diamond grains have an average particle size of from about 0.01 to 6 microns, and the sintering aid material has an average grain size that is the same or less than the fine-sized diamond grains.

17. The method as recited in claim 13 further comprising placing the mixture adjacent to a metallic substrate prior to subjecting to high pressure/high temperature process conditions to join the polycrystalline diamond to the substrate.

18. The method as recited in claim 13 wherein the polycrystalline diamond construction comprises mostly bonded together coarse-sized diamond grains, and wherein contact areas between the bonded together coarse-sized diamond grains are substantially free of graphite.

19. The method as recited in claim 13 wherein the sintering aid is a metal catalyst and includes a Group VIII metal.

\* \* \* \* \*